United States Patent [19]

Sinha et al.

[11] 4,333,146

[45] Jun. 1, 1982

[54] DEVICE FOR ELIMINATING THE VEHICLE WHEEL LOCKING RISK AT BRAKING

[75] Inventors: Brajnandan Sinha, 1 Spovgränd, S-951 47 Luleå, Sweden; Sven-Erik Tiberg, Gammelstad, Sweden

[73] Assignee: Brajnandan Sinha, Luleå, Sweden

[21] Appl. No.: 145,213

[22] Filed: Apr. 30, 1980

[30] Foreign Application Priority Data

May 2, 1979 [SE] Sweden ............................ 7903814

[51] Int. Cl.³ ........................... G06G 7/70; B60T 8/00
[52] U.S. Cl. ..................................... 364/426; 303/104
[58] Field of Search ................ 364/426; 303/104, 105, 303/106, 108, 112; 188/181 T

[56] References Cited

U.S. PATENT DOCUMENTS

| 3,544,172 | 12/1970 | Howard et al. | 303/20 |
| 3,743,361 | 7/1973 | Vieth, Jr. | 303/112 |
| 3,923,345 | 12/1975 | Poggie | 303/112 |

FOREIGN PATENT DOCUMENTS

| 346507 | 7/1972 | Sweden . |
| 1378998 | 1/1975 | United Kingdom . |
| 1500056 | 2/1978 | United Kingdom . |
| 1519611 | 8/1978 | United Kingdom . |

*Primary Examiner*—Jerry Smith
*Attorney, Agent, or Firm*—Cushman, Darby & Cushman

[57] ABSTRACT

A device for eliminating the locking risk of vehicle wheels at the application of a braking force, comprises an accelerometer mounted on a non-rotary portion connected with the wheel axle for emitting continuously, in response to the motions of the mounting point due to irregularities of the road, a primary signal indicative of the acceleration of the point as influenced by the damping properties of the wheel tire; an electronic unit for transforming the primary signal to a secondary signal, the strength of which is related to the speed of changes in the primary signal, and a control device connected to the electronic unit and controlling the braking force of a fluid-operated brake system so as to momentarily reduce the braking force in response to a sudden change in the secondary signal, corresponding to a sudden reduction in the ground braking moment of the wheel and due to reduced damping of the tire, whereby the locking risk is removed.

5 Claims, 1 Drawing Figure

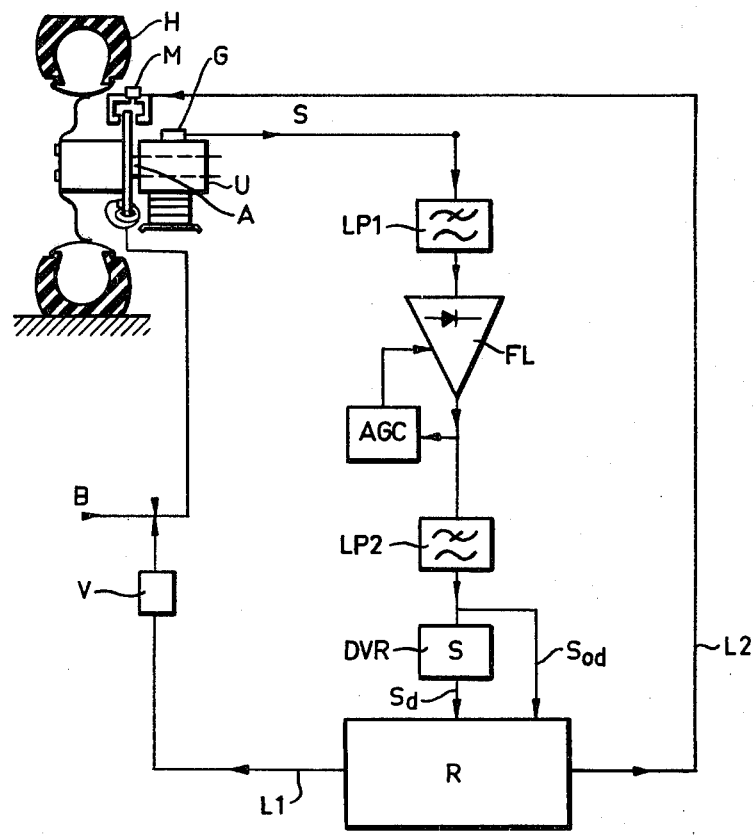

DEVICE FOR ELIMINATING THE VEHICLE WHEEL LOCKING RISK AT BRAKING

This invention relates to a device, which eliminates the risk that vehicle wheels become locked during braking.

Traffic accidents very often are due to the locking of wheels during braking and their resulting skidding. During braking, the tires, transfer a braking moment, which decreases rapidly when the wheels become locked. It should, thus, be possible to read the risk of locking by continuously measuring the variations in the braking moment. The present invention is based on the observation that, when a tire is loaded both radially and tangentially, its natural oscillation frequency and damping varies with the load in such a way, that with increasing mass carried by the tire the damping increases while simultaneously the frequency decreases. It applies in an analogous manner to the moment transfer of the tire, that the damping of the tire increases with increasing moment. As, thus, the tire damping is proportional to the braking moment, it is desired to continuously measure the variations in said damping in order to obtain an early warning of locking.

The present invention offers a practical arrangement for eliminating the aforesaid wheel locking risk, in that an accelerometer is attached to a non-rotary means connected to the wheel axle, which accelerometer upon motions of the attachment point emits a primary signal, which is responsive to the dynamic behaviour of the wheel, to an electronic unit, which transforms the primary signal to a secondary signal, the strength of which is related to the speed of changes in the primary signal, and that a means controlling the braking force is connected to the electronic unit and capable to momentarily reduce the braking force and thereby to abolish the locking risk in response to a sudden change in the secondary signal corresponding to a sudden reduction of the ground braking moment of the wheel.

The invention is described in greater detail in the following, with reference to the accompanying drawing, which in a schematic manner shows an embodiment of the device according to the invention for sensing and abolishing the brake locking risk.

A transducer G in the form of an accelerometer, one for each wheel on the same axle, is attached near the wheel hub on the spring suspension means U of the wheel H. The accelerometer, which senses the natural oscillation frequency and damping of the tire by measuring the axle vibrations when the vehicle passes over road irregularities, preferably can be a piezoelectric element, which at the embodiment shown is mounted facing upward on the wheel suspension U and at its free end supports a metal plate. When the base point of the piezoelectric element is accelerated at the passing of the vehicle over road irregularities, the point motion is transferred vertically via the piezoelectric element to said plate. The mass inertia of the plate opposes the acceleration motion and thereby momentarily compresses the element. The piezoelectric effect thereof results in a measurable current impulse S, which is proportional to its compression caused by the road bumps via the tire, axle and absorber spring, and the amplitude of which decays due to the damping of the axle oscillation.

The output signal S of the accelerometer in the form of a current impulse is passed to a low-pass filter LP1 and thereafter to an amplifier FL. This includes a rectifier and also has a circuit AGC for automatic gain control. The output signal from the amplifier which is filtered and rectified, is passed through a second low-pass filter LP2 for additional smoothing. The output of the filter LP2 is connected to the input of a derivator DVR and directly to a first input of a control means R for the braking force. The output of the derivator DVR is connected to a second input of the control means R. The means R, thus, is continuously fed with an underivated signal $S_{od}$ and a derivated signal $S_d$, said latter with momentary variations in agreement with the variations in the damping.

The control means R, which via a conduit L1 communicates with a valve V for adjusting the braking pressure B from a hydraulic or compressed air source (not shown), is capable to reduce the braking force when a spike corresponding to a sudden decrease of the ground braking moment of the wheel occurs in the derivated signal $S_d$, and then again to increase the braking force until a new spike occurs. If the control means should fail to note a spike, the underivated signal $S_{od}$ arranges so that, when braking force is applied but the damping signal is zero for a short period, the means reacts in the same way as if a spike had occurred in the derivated signal.

As a compliment to the hydraulic or pneumatic pressure control, a superimposed braking force can be used which is generated through an eddy-current brake and also is controlled from the control means R. This is indicated in the drawing by a conduit L2, which extends from the means and at the embodiment shown feeds the coil of an electromagnet M acting on the brake disc. The braking force thereby becomes proportional to the speed of the vehicle and the strength of the magnetic field. The eddy-current brake acts considerably faster than the pressure control and like this also acts at low speeds.

The invention is not restricted to the embodiments described above, but many different modifications are possible within the scope of the invention. It is especially possible to base the measuring of the ground braking moment of the wheel on the resilience of the tire instead of on its damping. It is, of course, possible to use accelerometers of a kind other than piezoelectric ones. Finally is to be observed, that due to the system according to the invention being based on a distinct reduction of the braking moment exerted by the wheel, also an indication of such defects in the brake mechanism is obtained which express themselves in strongly reduced braking capacity, such as worn brake shoes or linings.

What we claim is:

1. A device for eliminating the locking risk of vehicle wheels at the application of a braking force, comprising an accelerometer mounted on a non-rotary portion connected with the wheel axle for emitting continuously, in response to the motions of the mounting point due to irregularities of the road, a primary signal indicative of the acceleration of said point as influenced by the damping properties of the wheel tire; first means for transforming the primary signal to a secondary signal, the strength of which is related to the speed of changes in said primary signal, and second means connected to said first means and controlling the braking force of a fluid-operated brake system so as to momentarily reduce the braking force in response to a sudden change in said secondary signal, corresponding to a sudden reduction in the ground braking moment of the wheel and due to reduced damping of the tire, whereby the locking risk is removed.

2. A device as defined in claim 1, wherein said accelerometer is rigidly mounted adjacent a respective one of the wheel hubs of said wheel axle for continuously measuring the vibrations thereof in the vertical direction, the output of each accelerometer being connected to a rectifier in series with a derivating circuit, constituting said first means, the output of which is connected to an input of said second means for controlling the braking force, the output of said second means being connected to said brake system for momentarily reducing the braking force at the occurrence of a spike in the derivated signal from said derivating circuit, which spike indicates a sudden reduction in the ground braking moment of the wheel.

3. A device as defined in claim 2, wherein a low-pass filter and an amplifier are connected in series between said accelerometer and said rectifier.

4. A device as defined in claim 2, wherein said second means for controlling the braking force is provided with a second input connected to the input of said derivating circuit to receive the un-derivated signal, thereby to safeguard against failure of said second means to register a spike in the derivated signal.

5. A device as defined in claim 2, wherein said fluid-operated brake system is supplemented with an eddy-current brake formed by an electromagnet connected to a second output of said second means for controlling the braking force and positioned adjacent a brake surface of the wheel for inducing retarding eddy currents therein.

* * * * *